United States Patent
Tamaki

(10) Patent No.: US 8,228,955 B2
(45) Date of Patent: Jul. 24, 2012

(54) WIRELESS COMMUNICATION SYSTEM, BASE STATION AND TRANSMISSION TIMING CONTROL METHOD

(75) Inventor: Tsuyoshi Tamaki, Machida (JP)

(73) Assignee: Hitachi, Ltd., Tokyo (JP)

(*) Notice: Subject to any disclaimer, the term of this patent is extended or adjusted under 35 U.S.C. 154(b) by 534 days.

(21) Appl. No.: 12/349,646

(22) Filed: Jan. 7, 2009

(65) Prior Publication Data

US 2009/0232113 A1    Sep. 17, 2009

(30) Foreign Application Priority Data

Mar. 17, 2008 (JP) .................................. 2008-067707

(51) Int. Cl.
*H04J 3/06*  (2006.01)
(52) U.S. Cl. ........................ 370/508; 370/337; 370/350
(58) Field of Classification Search .................. 370/337, 370/350, 508
See application file for complete search history.

(56) References Cited

U.S. PATENT DOCUMENTS 5,761,198 A * 6/1998 Kojima .......................... 370/337

OTHER PUBLICATIONS

M. Costa, "Writing on Dirty Paper", IEEE Transactions on Information Theory, vol. IT-29, Issue 3, May 1983, pp. 440.
W. Yu, et al., "Sum Capacity of Gaussian Vector Broadcast Channels" IEEE Transactions on Information Theory, vol. 50, No. 9, Sep. 2004, pp. 1875-1892.
S. Shamai, et al., "Enhancing the Cellular Downlink Capacity via Co-Processing a the Transmitting End", Proceedings of IEEE Vehicular Tech. Conf., May 2001, pp. 1745-1749.

* cited by examiner

*Primary Examiner* — Chandrahas Patel
(74) *Attorney, Agent, or Firm* — Mattingly & Malur, PC

(57) ABSTRACT

A wireless communication system includes first and second transmitting stations cooperating with each other to transmit data signals in parallel to the same receiving station. The first transmitting station transmits data at a slot reference timing of each TDMA slot within a data transmission period. The second transmitting station calculates the adjustment amount of data transmission timing for the receiving station within a propagation delay time measurement period, and transmits data at a transmission timing determined by a slot reference timing and the adjustment amount in each TDMA slot within the data transmission period.

12 Claims, 9 Drawing Sheets

WIRELESS COMMUNICATION SYSTEM, BASE STATION AND TRANSMISSION TIMING CONTROL METHOD

CLAIM OF PRIORITY

The present application claims priority from Japanese patent application JP 2008-067707, filed on Mar. 17, 2008, the content of which is hereby incorporated by reference into this application.

BACKGROUND OF THE INVENTION

1. Field of the Invention

The present invention relates to a wireless communication system, and more particularly, to a wireless communication system, a base station and a data transmission timing control method capable of improving system throughput by transmitting data in parallel to the same mobile station from a plurality of base stations cooperating mutually.

2. Description of the Related Art

With an increase in communication speed in recent years, a MIMO (multiple input multiple output) technique capable of improving frequency utilization efficiency has been used in a wireless LAN or a mobile communication system. In a MIMO system, a transmitting station transmits data in parallel through a plurality of antennas, and a receiving station receives the data transmitted from the transmitting station with a plurality of antennas.

In a wireless communication system in which a transmitting station and a receiving station perform communication in a one-to-one manner, a singular value decomposition (SVD) beamforming transmission method has been proposed in order to maximize the communication capacity of a radio propagation channel. In the SVD beamforming transmission method, singular value decomposition is performed on channel matrix H indicating radio propagation path characteristics between the transmitting and receiving antennas. The matrix obtained by the singular value decomposition is weighted to a transmission vector signal and a reception vector signal in order to maximize the capacity of the propagation channel.

However, as the SVD beamforming transmission method needs to feed back channel information measured by the receiver side to the transmitter side, this method is not suitable for a communication environment in which a radio propagation channel varies greatly. The SVD beamforming transmission method is suitable, therefore, to improve the communication throughput in a wireless communication system provided that communication is performed in a quasi-static environment having little variation in the radio propagation channel, such as a wireless LAN system.

Many studies have been conducted on the communication capacity in terms of information theory, for example, in a one-to-N wireless communication system (BC: broadcast channel) in which one transmitting station communicates with a plurality of receiving stations and an M-to-one wireless communication system (MAC: multiple access channel) in which a plurality of transmitting stations communicate with one receiving station.

With respect to the communication capacity of BC, for example, dirty paper coding has been known as disclosed in "Writing on dirty paper" by M. Costa, IEEE Trans. Information Theory, Vol. 29, Issue 3, May 1983, pp. 440. It is proved that the dirty paper coding gives the upper bound of the system capacity, for example, by W. Yu and J. M. Cioffi, in "Sum capacity of Gaussian vector broadcast channels" IEEE Trans. Information Theory, Vol. 50, No. 9, pp. 1875-1892, September 2004.

However, a definite means for realizing the upper limit of the system capacity has not been known yet. In addition, the dirty paper coding is established only when a transmitter acquires the instantaneous channel information measured by a receiver. However, because large performance deterioration occurs due to a large channel variation during when the channel information measured by the receiver is fed back to the transmitter, it is difficult to realize the upper bound of the communication capacity of BC.

Further, it has been known that the communication capacity of BC is limited by the number of antennas provided in the transmitting station. A technique for performing dirty paper coding by cooperation among a plurality of transmitting stations so as to improve the overall throughput of a system is disclosed by S. Shamai and B. Zaidel, in "Enhancing the cellular downlink capacity via co-processing at the transmitting end", Proceedings of IEEE Vehicular Tech. Conf., May 2001-Spring, pp. 1745-1749. However, the document premises an ideal communication system in which transmission and reception timings are completely synchronized with each other, but does not disclose a realizable cooperative control method taking a signal propagation delay, which occurs between a transmitting station and a receiving station during actual data communication, into consideration.

SUMMARY OF THE INVENTION

In a MIMO-type wireless communication system that uses virtual parallel paths between a transmitting station and a receiving station, parts of the signals transmitted in parallel from a plurality of antennas of the transmitting station reach the receiving station after reflected by, for example, a wall between the transmitting station and the receiving station. Therefore, parallel signals transmitted from the transmitting station at the same time arrive at a plurality of antennas of the receiving station as parallel signals having a propagation delay time difference because their propagation paths are different for each transmission antenna. In order to absorb the difference in propagation delay times depending on the signal paths, the MIMO-type wireless communication system adopts OFDM (Orthogonal frequency division multiplexing) technology which defines a time width, called a guard interval, at the head of each signal reception period, and the receiving station performs a MIMO receive processing by treating only signal sequences received within the guard interval as effective signal sequences having been transmitted in parallel from the transmitting station.

In the case where first and second transmitting stations distant from each other are cooperated so as to transmit MIMO parallel signals to the same receiving station, however, a propagation delay time difference exceeding the guard interval occurs in the parallel signals at the receiving station when the antenna group of the first transmitting station is too away from the antenna group of the second transmitting station. Therefore, it becomes difficult for the receiving station to perform the MIMO receive processing.

An object of the invention is to provide a wireless communication system and a transmission timing control method capable of transmitting data in parallel to one receiving station with high throughput by performing cooperative control on a plurality of transmitting stations.

Another object of the invention is to provide a wireless communication system and a transmission timing control method capable of allowing a receiving station to receive data transmitted in parallel from a plurality of transmitting stations to the receiving station, within the allowable range of a time difference.

Still another object of the invention is to provide a wireless base station capable of transmitting data to one or more receiving stations by cooperating with another base station so as to control the data transmission timing such that the range of a variation in the signal reception timing at the receiving station falls within a guard interval.

In order to achieve the objects, according to the invention, a data transmission timing control method in a wireless communication system in which a first transmitting station and a second transmitting station, each having a plurality of antennas, cooperate with each other to transmit data signals in parallel to the same receiving station through a series of TDMA (Time Division Multiple Access) slots, comprises the steps of: detecting by the second transmitting station, a signal propagation delay time between the first and second transmitting stations and signal propagation delay times between the receiving station and the first and second transmitting stations within a propagation delay time measurement period before a data transmission period; calculating by the second transmitting station, the adjustment amount of data transmission timing for the receiving station based on the signal propagation delay times detected within the propagation delay time measurement period; transmitting data from the first transmitting station to the receiving station at a slot reference timing of each of TDMA slots within the data transmission period; and transmitting data from the second transmitting station to the receiving station at a transmission timing determined by the slot reference timing, the signal propagation delay time between the first and second transmitting stations, and the adjustment amount in each of TDMA slots within the data transmission period.

Specifically, the propagation delay time measurement period includes a first TDMA slot and a second TDMA slot. The first transmitting station transmits a first synchronization control signal to the receiving station at a slot reference timing of the first TDMA slot, and the receiving station having received the first synchronization control signal transmits a first response signal to the first transmitting station after a predetermined time T has elapsed. The second transmitting station detects the reception time of the first synchronization control signal transmitted from the first transmitting station and the reception time of the first response signal transmitted from the receiving station within the first TDMA slot, and stores first time information indicating a time difference between the slot reference timing of the first TDMA slot and the reception time of the first synchronization control signal and second time information indicating a time difference between the reception time of the first synchronization control signal and the reception time of the first response signal.

The second transmitting station transmits a second synchronization control signal to the receiving station at a slot reference timing of the second TDMA slot, and the receiving station having received the second synchronization control signal transmits a second response signal to the second transmitting station after a predetermined time T has elapsed. The second transmitting station measures a time difference between the transmission time of the second synchronization control signal and the reception time of the second response signal transmitted from the receiving station within the second TDMA slot, and calculates the adjustment amount of data transmission timing based on the first and second time information and third time information indicating the measured time difference.

For example, when the time difference indicated by the first time information is Tab, the time difference indicated by the second time information is T1, and the time difference indicated by the third time information is T2, the adjustment amount of data transmission timing is represented by Tab−(T2−T1).

The data transmission timing control method according to the invention is applicable to the case where the first and the second transmitting stations cooperate with each other to transmit data signals in parallel to a plurality of receiving stations. In this case, the second transmitting station detects a signal propagation delay time between the first and second transmitting stations and signal propagation times between each of the receiving stations and the first and second transmitting stations within the propagation delay time measurement period before the data transmission period. The second transmitting station calculates the adjustment amount of data transmission timing for each of the receiving stations based on the signal propagation delay times detected within the propagation delay time measurement period, the first transmitting station transmits data to each of the receiving stations at a slot reference timing in each TDMA slot within the data transmission period, and the second transmitting station transmits data to each of the receiving stations at different transmission timings determined for each receiving station based on the slot reference timing, the signal propagation delay time between the first and second transmitting stations and the adjustment amount of data transmission timing, in each TDMA slot within the data transmission period.

Specifically, in the case where the propagation delay time measurement period includes a first TDMA slot and a second TDMA slot, the first transmitting station transmits a first synchronization control signal at a slot reference timing of the first TDMA slot, each of the receiving stations having received the first synchronization control signal transmits a first response signal to the first transmitting station after an individual waiting time different for each receiving station has elapsed. The second transmitting station detects the reception time of the first synchronization control signal transmitted from the first transmitting station and the reception time of each of the first response signals transmitted from the receiving stations within the first TDMA slot, and stores first time information indicating a time difference between the slot reference timing of the first TDMA slot and the reception time of the first synchronization control signal and second time information indicating a time difference between the reception time of the first synchronization control signal and the reception time of the first response signal for each receiving station.

The second transmitting station transmits a second synchronization control signal at a slot reference timing of the second TDMA slot, and each of the receiving stations having received the second synchronization control signal transmits a second response signal to the second transmitting station after the individual waiting time has elapsed. The second transmitting station measures a time difference between the transmission time of the second synchronization control signal and the reception time of the second response signals transmitted from the receiving stations within the second TDMA slot, and calculates for each of the receiving stations the adjustment amount of data transmission timing based on the first time information, the second time information and third time information indicating a time difference between the transmission time of the second synchronization control signal and the reception time of the second response signal.

In one embodiment of the invention, the first transmitting station transmits a pilot signal together with the data signal at the slot reference timing of each TDMA slot within the data transmission period, and the second transmitting station detects a time difference between the slot reference timing and the reception time of the pilot signal and calculates the adjustment amount of data transmission timing by using the time difference as the latest value of Tab in each TDMA slot within the data transmission period, thereby to apply the adjustment amount to the next TDMA slot.

According to the invention, a base station connected to a base station controller and provided with a plurality of antennas for transmitting data in parallel to a receiving station in cooperation with another base station connected to the base station controller through a series of TDMA slots, comprises:

a transmission control unit to transmit, if the base station is designated as a main base station by the base station controller, a first synchronization control signal to the receiving station at a slot reference timing of a first TDMA slot within a propagation delay time measurement period before a data transmission period, and transmit if the base station is designated as a subordinate base station by the base station controller, a second synchronization control signal to the receiving station at a slot reference timing of a second TDMA slot within the propagation delay time measurement period;

a detection unit to detect, if the base station is designated as the subordinate base station, the reception time of a first synchronization control signal transmitted from the other base station and the reception time of a first response signal transmitted from the receiving station in the first TDMA slot within the propagation delay time measurement period, store in a memory, first time information indicating a time difference between the slot reference timing of the first TDMA slot and the reception time of the first synchronization control signal and second time information indicating a time difference between the reception time of the first synchronization control signal and the reception time of the first response signal, detect a time difference between the transmission time of the second synchronization control signal and the reception time of a second response signal transmitted from the receiving station within the second TDMA slot, and store third time information indicating the time difference in the memory;

a calculator to calculate the adjustment amount of data transmission timing for the receiving station based on the first, second, and third time information stored in the memory, and store the adjustment amount in the memory; and a transmission timing controller for transmitting if the base station is designated as the main base station, data to the receiving station at a slot reference timing of each TDMA slot within the data transmission period, and transmitting if the base station is designated as the subordinate base station, data to the receiving station at a transmission timing determined based on the slot reference timing, the first time information and the adjustment amount stored in the memory, in each TDMA slot within the data transmission period for the receiving station.

According to the invention, by making a plurality of transmitting stations, such as base stations, cooperate with one another to transmit data in parallel to the same receiving station, it is possible to synchronize the reception timings of parallel data signals at the receiving station to the extent of an allowable range defined with a guard interval. According to the invention, therefore, the receiving station can normally perform MIMO signal processing on the received data signals. In addition, as the number of effective antennas for data transmission increases by making a plurality of transmitting stations cooperate with one another, it is possible to improve the overall throughput of the communication system.

DESCRIPTION OF THE PREFERRED EMBODIMENTS

Hereinafter, exemplary embodiments of the invention will be described with reference to the accompanying drawings.

Figure 1:
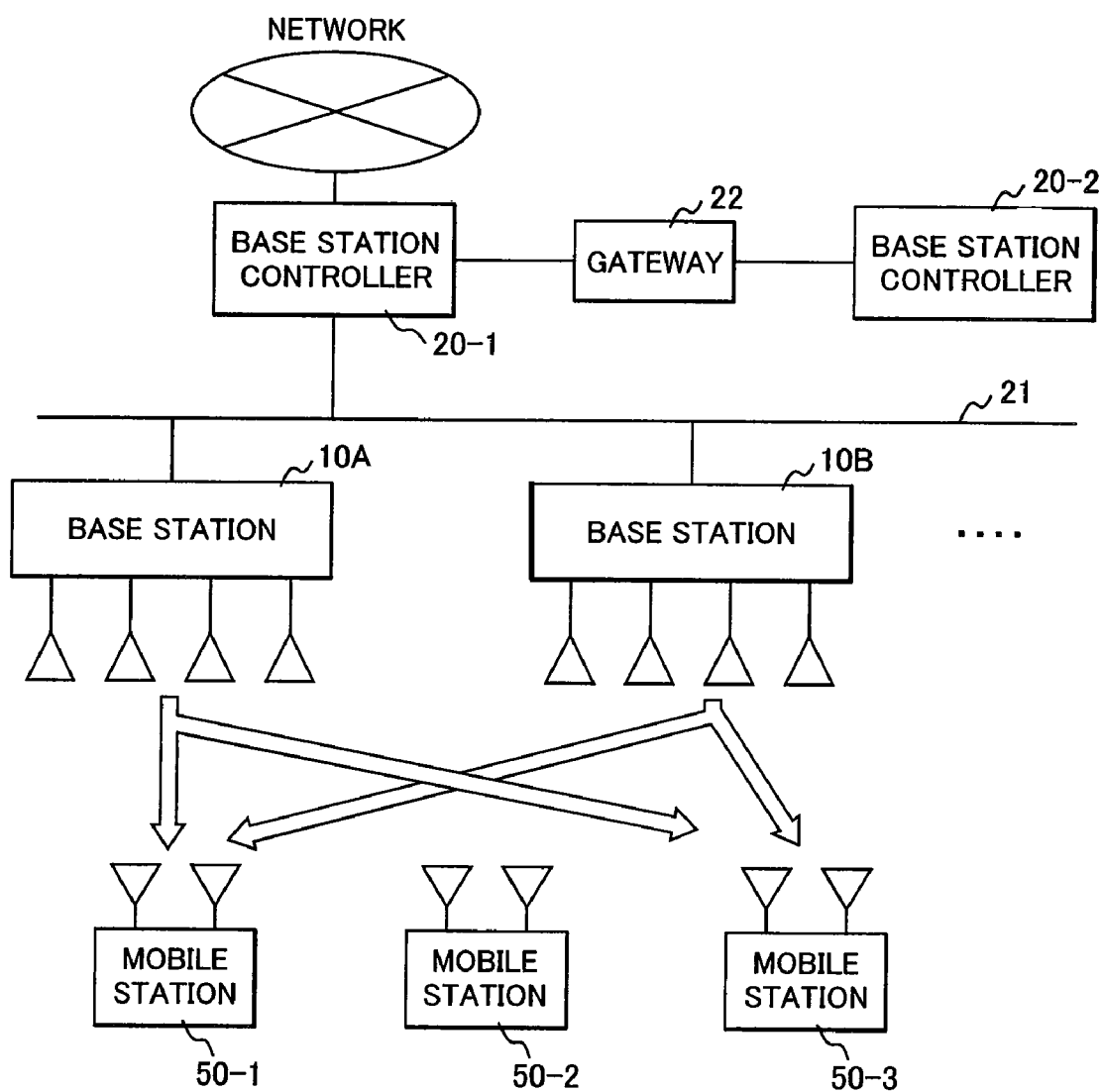
FIG. 1 is a diagram illustrating an example of a wireless communication system to which the invention is applied.

FIG. 1 is a diagram illustrating an example of the overall structure of a wireless communication system to which the invention is applied.

The wireless communication system comprises a base station controller 20-1 connected to a network NW, a plurality of base stations 10 (10A, 10B, . . . ) connected to the base station controller 20-1 through a line 21, and a plurality of mobile stations 50 (50-1, 50-2, . . . ) communicating with these base stations. Each of the base stations 10 and the mobile stations 50 has a plurality of antennas. The base station controller 20-1 manages the plurality of base stations 10A, 10B, . . . connected thereto, and controls some of the base stations so as to cooperate with one another so that they communicate with at least one of the mobile stations in a cooperative control mode.

FIG. 1 shows an example in which the base stations 10A and 10B cooperate with each other to perform data transmission to the mobile stations 50-1 and 50-3 in a cooperative control mode. By cooperatively operating a plurality of base stations so as to transmit data to the mobile stations as above, it is possible to increase the number of effective transmission antennas and improve the overall throughput of a system.

Antennas of each of the mobile stations 50 receive data signals transmitted in parallel from the base stations 10A and 10B through a plurality of antennas. In order to separate a desired signal from the signals received by the antennas, for example, a successive interference cancellation method is used. The successive interference cancellation method obtains a first data signal by decoding an encoded signal output from the antenna in the best reception status. By re-encoding the first data signal and subtracting the re-encoded signal from the received signal, signal components other than the first data signal remain. Therefore, it is possible to separate a desired signal from the received signals by repeating a process of decoding the remaining signal, re-encoding the signal, and subtracting the re-encoded signal from the received signal.

The base station controller 20-1 is connected to another base station controller 20-2 through a gate way (GW) 22. By exchanging channel state information of base stations under control between these base station controllers, it is able to prevent interference between base stations each belonging to different base station controller. Further, by performing cooperative control between a plurality of base station controllers, if necessary, it is able to cooperatively operate a plurality of base stations belonging to different base station controllers.

Next, description will be made with reference to FIG. 2 about a problem which occurs when the base stations 10A and 10B cooperate with each other to transmit data in parallel to the mobile station 50-1. It is assumed here that there occurs a synchronization time difference Te between the base stations 10A and 10B when the base station 10A transmits a data signal Sa1 to the mobile station 50-1 and the base station 10B transmits a data signal Sb1 to the mobile station 50-1.

The data signal Sa1 transmitted from the base station 10A reaches the mobile station 50-1 through different paths (multi-path), like a direct wave and a reflected wave. In FIG. 2, the data signal Sa1 reaches the mobile station 50-1 as data signals Sa1(1) and Sa1(2) having a time difference therebetween. Ta indicates the propagation delay time of the data signal Sa1.

As a wireless communication system capable of improving the tolerance to a time difference caused by the multi-path, an OFDM (Orthogonal frequency division multiplexing) system has been known. In order to prevent interference between symbols to be the units of demodulation signals in the OFDM demodulate processing, a guard interval GI having no signals is defined between transmission symbols. As the guard interval is designed in consideration of a distance between the base station and the mobile station or a time difference between signal propagation paths due to a reflector existing around the base station, it may be assumed that a propagation delay difference between the data signals Sa1(1) and Sa1(2) caused by a difference between propagation paths falls within an allowable time width defined by the guard interval GI.

The data signal Sb1 transmitted from the base station 10B to the mobile station 50-1 passes through different paths and reaches the mobile station 50-1 as signals Sb1(3) and Sb1(4). Tb indicates the propagation delay time of the data signal Sb1.

If the synchronization time difference Te exists between the base stations 10A and 10B, a possibility that the time difference Td between the data signals Sa1 and Sb1 will exceed the guard interval GI increases when a time difference between the propagation delay times Ta and Tb is took into account. In particular, in a wireless communication system in which the base stations 10A and 10B are asynchronously operated, such as a wireless LAN system, a relatively large synchronization time difference Te occurs between the base stations. In this case there is a possibility that the time difference between the reception timings of the data signals Sa1 and Sb1 will increase at the mobile station 50-1 even when the base stations 10A and 10B transmit data at the same time logically. Further, since the data signals Sa1 and Sb1 act as interference components with each other, it becomes difficult for the mobile station 50-1 to separate a desired signal from the received signals, for example, by the successive interference cancellation method.

Figure 3:
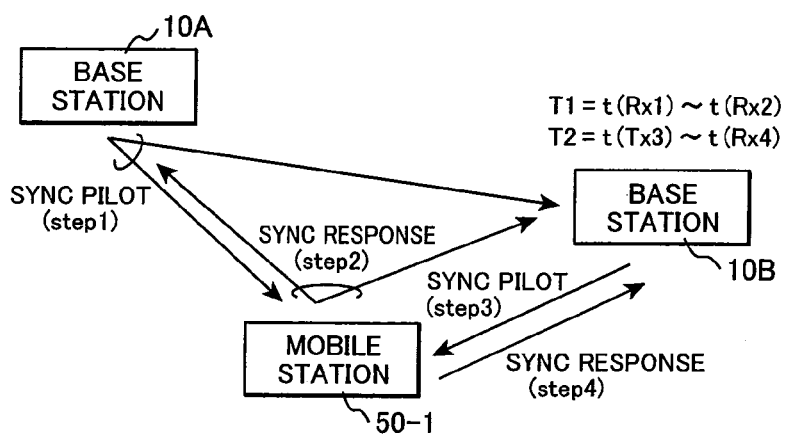
FIG. 3 is a diagram illustrating the measurement of a propagation delay time necessary for the cooperative control among a plurality of base stations.

FIG. 3 is a diagram illustrating the measurement of a propagation delay time necessary for the cooperative control among a plurality of base stations according to the invention.

Here, two base stations 10A and 10B cooperate with each other. The base station 10A serves as a main base station, and the base station 10B serves as a subordinate base station. The subordinate base station 10B adjusts the transmission timing of signals addressed to the mobile station 50-1 (synchronization control) such that a signal transmitted from the base station 10A and a signal transmitted from the base station 10B reach the mobile station 50-1 at the same time. The synchronization control described here is applicable to data transmission timing control intended for a plurality of mobile stations, for example, transmission timing control to synchronize the reception timing of the signal transmitted from the base station 10A with the signal transmitted from the base station 10B at both the mobile stations 50-1 and 50-3 shown in FIG. 1.

In this embodiment, each of the base stations 10A and 10B communicates with the mobile station during TDMA slots each having a fixed period. In this case, the base stations synchronize their base station timers with each other according to a protocol, such as an NTP (Network Time Protocol), and generate TDMA slots independently in accordance with the base station timers. The boundaries of TDMA slots do not need high-accuracy synchronization, such as the guard interval.

Figure 4:
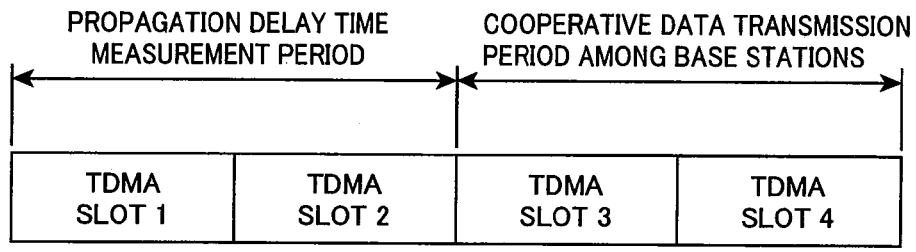
FIG. 4 is a diagram illustrating the relationship between a propagation delay time measurement period and a cooperative data transmission period among the base stations.

Next, synchronization control according to an embodiment of the invention will be described about the case where, as shown in FIG. 4, TDMA slot 1 and TDMA slot 2 are used for a propagation delay time measurement period and TDMA slot 3 and TDMA slot 4 are used for a cooperative data transmission period among the base stations. In this embodiment, although the cooperative data transmission period includes only two TDMA slots to simplify the explanation, this period can include an arbitrary number of TDMA slots in the actual implementation.

Within the propagation delay time measurement period, the subordinate base station 10B measures propagation delay times necessary for the synchronization control about one or more mobile stations to be the objectives of cooperative control with the main base station 10A. The main base station 10A as well as the subordinate base station 10B can measure propagation delay times necessary for synchronization control within the propagation delay time measurement period.

Within the propagation delay time measurement period, the main base station 10A transmits a SYNC pilot signal to the mobile station 50-1, for example, in the TDMA slot 1 (Step 1), and the mobile station 50-1 having received the SYNC pilot signal transmits a SYNC response signal to the main base station after a predetermined waiting time T has elapsed (Step 2).

The subordinate base station 10B monitors the SYNC pilot signal transmitted from the main base station 10A and the SYNC response signal transmitted from the mobile station 50-1 in the TDMA slot 1, and measures a time difference T1 between the reception time t(Rx1) of the SYNC pilot signal and the reception time t(Rx2) of the SYNC response signal.

In the TDMA slot 2, the subordinate base station 10B transmits a SYNC pilot signal to the mobile station 50-1 (Step 3), and the mobile station 50-1 having received the SYNC pilot signal transmits a SYNC response signal to the subordinate base station after the waiting time T has elapsed (Step 4). The subordinate base station 10B measures a time difference T2 between the transmission time t(Tx3) of the SYNC pilot signal and the reception time t(Rx4) of the SYNC response signal.

By using a time difference ΔT(=T2−T1) between T2 and T1 measured within the propagation delay time measurement period, the subordinate base station 10B adjusts the transmission timing of signals for the mobile station 50-1 within the cooperative data transmission period, thereby achieving synchronization control for enabling the mobile station 50-1 to receive the signals transmitted from the base stations 10A and 10B at the same time.

Figure 5:
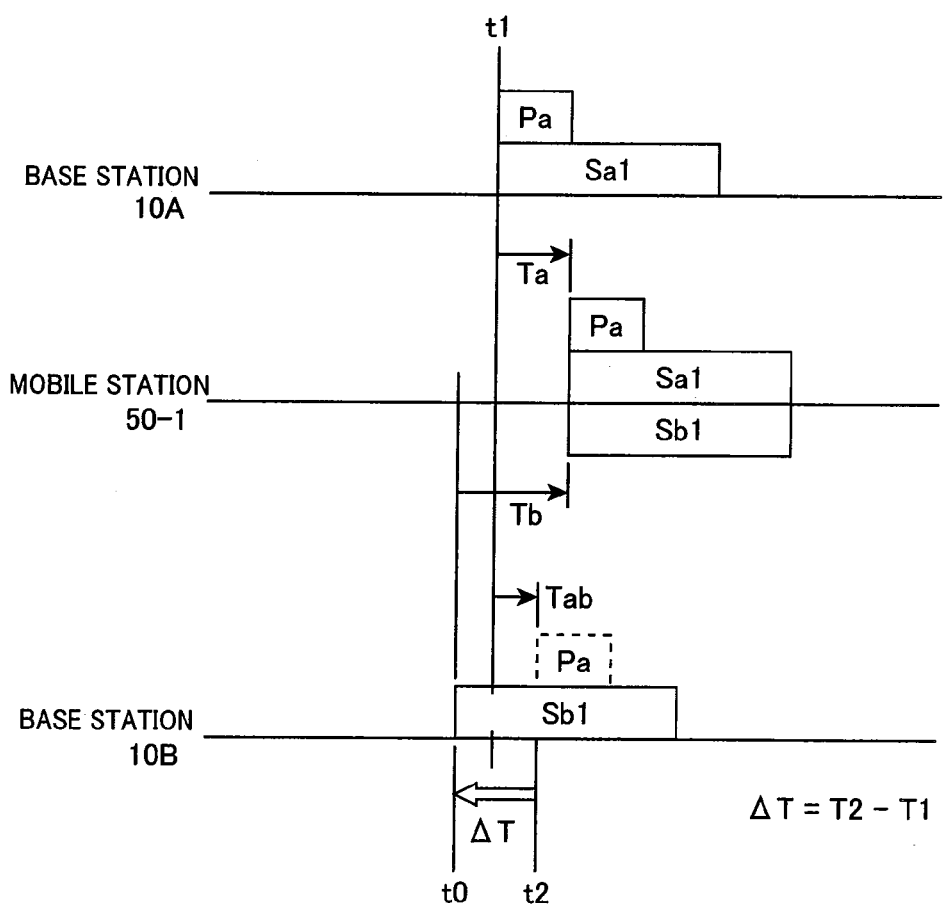
FIG. 5 is a diagram illustrating transmission timing control according to the invention when two base stations transmit data to one mobile station.

Specifically, as shown in FIG. 5, the subordinate base station 10B transmits the signal Sb1 to the mobile station 50-1 in the TDMA slot 3, at a timing t0 which is ΔT ahead of the reception timing t2 of a pilot signal Pa transmitted from the main base station 10A. The main base station 10A transmits the data signal Sa1 to the mobile station 50-1 at a slot reference timing t1 indicating the start of the TDMA time slot 3. The data signal Sa1 is received by the mobile station 50-1 after the propagation delay time Ta.

The propagation delay time Ta is expressed by D1/c when the distance between the main base station 10A and the mobile station 50-1 is D1 and the speed of light is c. Similarly, when the distance between the subordinate base station 10B and the mobile station 50-1 is D2, the data signal Sb1 transmitted from the subordinate base station 10B at the timing t0 is received by the mobile station 50-1 after a propagation delay time Tb=D2/c. If the distance between the main base station 10A and the subordinate base station 10B is D12, the necessary time Tab for the pilot signal Pa of the main base station 10A to reach the subordinate base station 10B is D12/c.

Therefore, by using the time t2 as a reference time at which the subordinate base station 10B receives the pilot signal Pa transmitted from the main base station 10A at the start time t1 of the TDMA slot 3, the subordinate base station 10B may transmit the data signal Sb1 at the timing to deviated by ΔT from the reference time t2.

$$\Delta T = Tb - Ta + Tab = (D2/c) - (D1/c) + D12/c)$$

Figure 2:
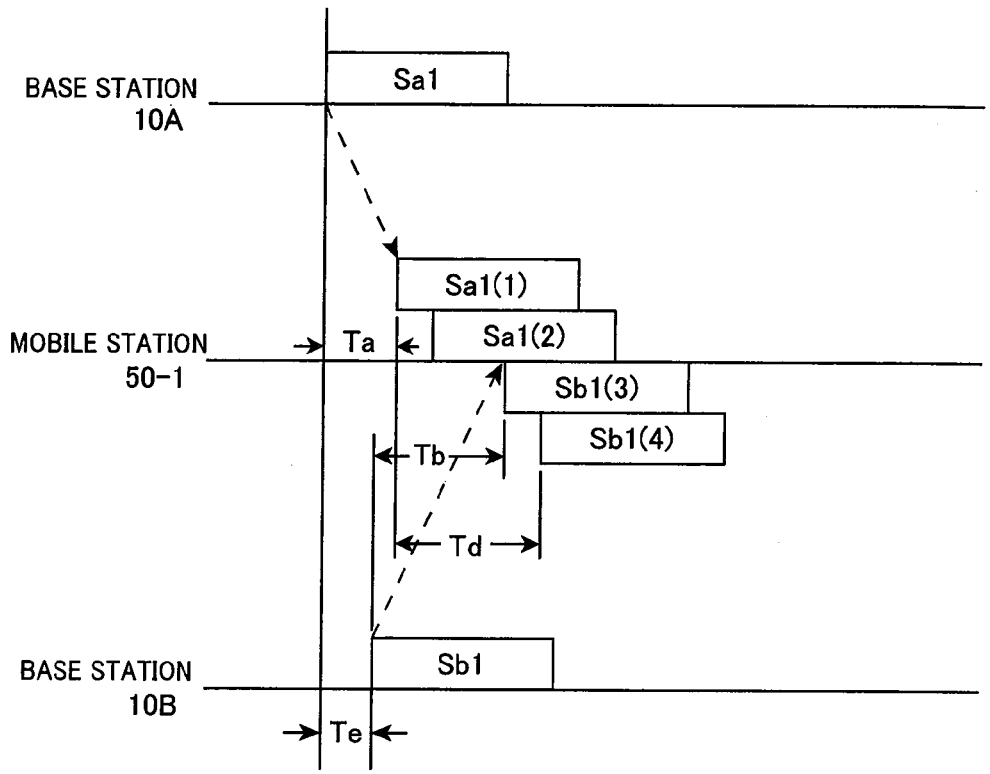
FIG. 2 is a diagram illustrating a problem which occurs when two base stations cooperate with each other to transmit data signals.

In this case, as the propagation delay time difference and the synchronization time difference described by referring to FIG. 2 are absorbed, the reception timings of the data signals Sa1 and Sb1 come close to a synchronized state at the mobile station 50-1. The value of Tab can be measured during the propagation delay time measurement period. It will be made clear that ΔT is equal to a time difference between T2 and T1 measured in the propagation delay time measurement period.

Figure 6:
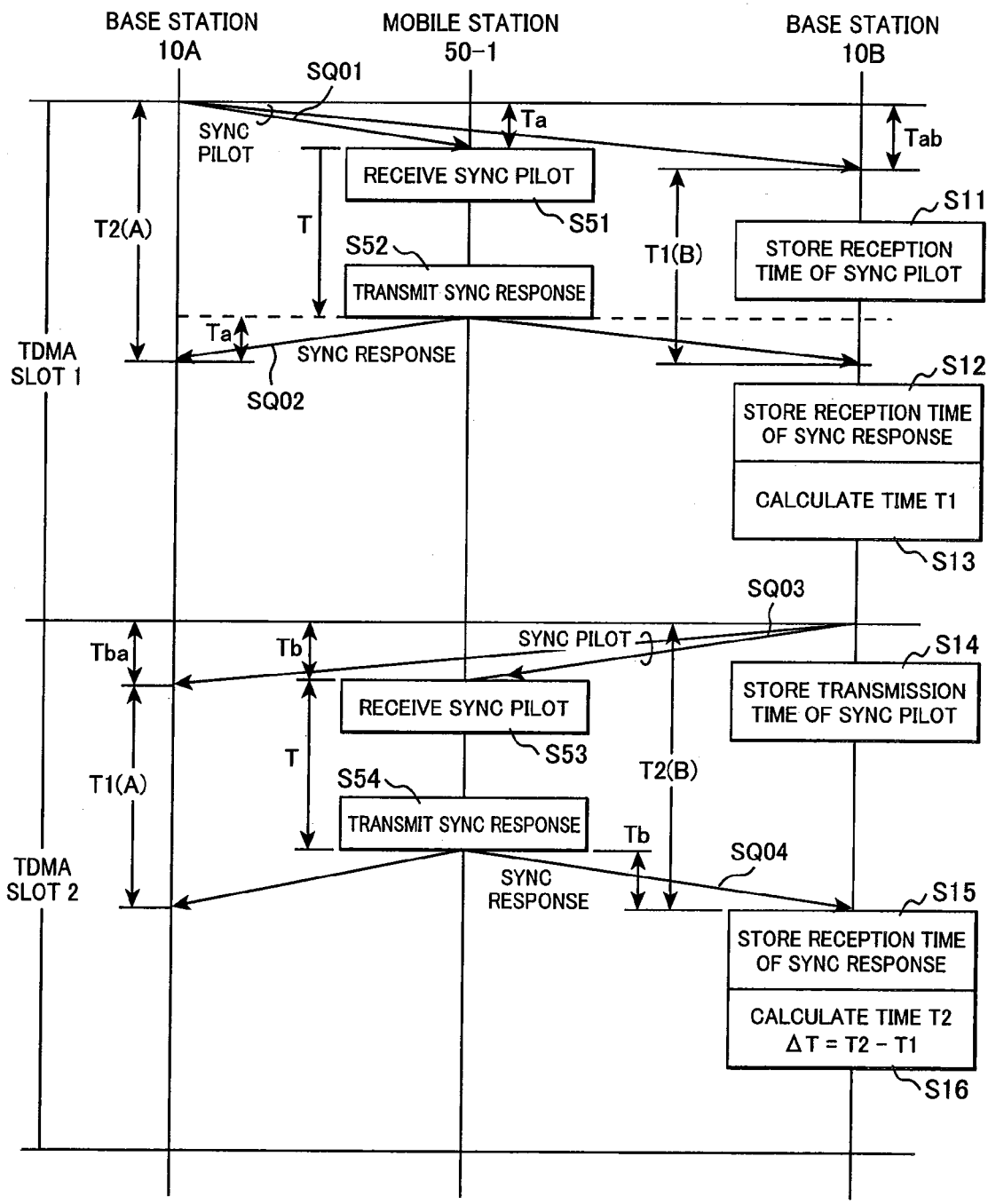
FIG. 6 is a diagram illustrating a communication sequence performed in the propagation delay time measurement period according to the first embodiment of the invention.

FIG. 6 is a diagram illustrating a communication sequence performed in the propagation delay time measurement period according to the first embodiment of the invention.

In the TDMA slot 1, the main base station 10A transmits a synchronization control signal (SYNC pilot) to the mobile station 50-1 at a slot reference timing (SQ01). The mobile station 50-1 having received the SYNC pilot (S51) transmits a SYNC response to the main base station 10A after a predetermined time T has elapsed (SQ02 and S52). The subordinate base station 10B monitors the signals communicated between the main base station 10A and the mobile station 50-1, stores the reception time of the SYNC pilot (S11) and the reception time of the SYNC response (S12), calculates a time difference T1(B), and stores the value of the time difference (S13). The main base station 10A also calculates a time difference T2(A) between the transmission time of the SYNC pilot and the reception time of the SYNC response, and stores the value of the time difference. In this case, A and B in the parentheses are given in order to identify the base station which measured the time differences T1 and T2.

The values of T1(B) and T2(A) can be represented by the following Expressions 1 and 2.

$$T1(B) = (D1/c) + T + (D2/c) - (D12/c) \tag{1}$$

$$T2(A) = (D1/c) \times 2 + T \tag{2}$$

In the TDMA slot 2, the subordinate base station 10B transmits a synchronization control signal (SYNC pilot) to the mobile station 50-1 (SQ03), and stores the transmission time of the SYNC pilot (S14). The mobile station 50-1 having received the SYNC pilot (S53) transmits a SYNC response to the subordinate base station 10B after the predetermined time T has elapsed (SQ04 and S54).

Upon receiving the SYNC response, the subordinate base station 10B stores the reception time the SYNC response (S15), and calculates (S16) a time difference T2(B) between the transmission time of the SYNC pilot and the reception time of the SYNC response, and the value of ΔT=T2−T1. The main base station 10A stores, as the value T1(A), the difference between the reception time of the SYNC pilot transmitted from the subordinate base station 10B and the reception time of the SYNC response transmitted from the mobile station 50-1.

The values of T2(B) and T1(A) can be represented by the following Expressions 3 and 4.

$$T2(B) = (D2/c) \times 2 + T \tag{3}$$

$$T1(A) = (D2/c) + T + (D1/c) - (D12/c)$$

$$= T1(B) \tag{4}$$

The following Expression 5 is obtained from Expressions 3 and 4.

$$T2(B) - T1(B) = (D2/c) - (D1/c) + (D12/c) \tag{3}$$

$$= Tb - Ta + Tab( = \Delta T)$$

Namely, it is understood that the transmission timing t0 of the data signal Sb1 from the subordinate base station 10B should be deviated by ΔT(=T2−T1) in the case where the reception time t2 of the pilot signal Pa transmitted from the main base station 10A is used as a reference timing. The transmission timing t0 of the data signal may possibly be later or be earlier than the reference timing t1 of the TDMA slot 3 depending on the value of Tab and the magnitude relationship between Tb and Ta.

In order to transmit the data signal Sb1 before the reception time t2 of the pilot signal Pa, it is necessary for the subordinate base station 10B to estimate previously the reception time t2 of the pilot signal in the TDMA slot 3. In this embodiment, because the base station 10 generates TDMA time slots having a fixed slot length, it is possible to estimate the reception timing of the pilot signal in the next time slot by using the reception timing of the pilot signal received in the previous time slot.

For example, the subordinate base station 10B stores a time difference Tab between the reception time of the SYNC pilot from the base station 10A in the TDMA slot 1 and the reference timing (start time) of the TDMA slot 1 within the propagation delay time measurement period. The subordinate base station 10B can estimate a pilot reception timing t2 in the TDMA slot 3 by adding the time difference Tab to the reference timing of the TDMA slot 3.

In the present invention, the data signals transmitted in parallel from two base stations 10A and 10B are required to be synchronized with each other to an extent within the time width of guard interval at the mobile station 50-1. Therefore, sufficient effects can be obtained by applying the time difference Tab detected in the propagation delay time measurement period to each TDMA time slot of the cooperative data transmission period.

Similarly, the main base station 10A can measure and store the time duration from the slot reference timing of the TDMA slot 2 to the reception time of the SYNC pilot transmitted from the subordinate base station 10B as a time difference Tba.

In FIG. 5, the base station 10A serves as a main base station for the synchronization control and transmits data signals at the reference timing t1 of the TDMA slot in the cooperative data transmission period. On the other hand, the base station 10B serves as a subordinate base station and transmits data signals at the timing to adjusted by $\Delta T$ in the cooperative data transmission period. However, as the main base station 10A also can calculate $\Delta T = T2(A) - T1(A)$, it is possible for the main base station to adjust the data transmission timing by using the values of $\Delta T$ and Tba. Therefore, the roles of the main base station and the subordinate base station may be switched in the cooperative data transmission period, so that the base station 10B transmits data at the reference timing and the base station 10A transmits data at the timing adjusted by $\Delta T$.

In the present invention, the main base station 10A may transmit the pilot signal Pa in synchronization with the data signal Sa1 to be transmitted at the reference timing t1 in each TDMA slot within the cooperative data transmission period, so that the subordinate base station 10B calculates a new time difference Tab between the reception time of the pilot signal Pa and the reference timing of the TDMA slot and uses the value of Tab in the next TDMA slot. By applying the latest value to the time difference Tab as above, it is possible to perform synchronization control adaptive to a fluctuation in the slot periods at the main base station 10A and the subordinate base station 10B.

In the cooperative data transmission period, the main base station 10A may delay the transmission timing of the pilot signal Pa by a fixed offset time from the slot reference timing t1 (the head of the data signal Sa1), instead of transmitting the pilot signal Pa at the reference timing t1 of each TDMA slot. In the case where the transmission time of the pilot signal Pa includes the offset from the head of the TDMA slot, the subordinate base station 10B can calculate an exact propagation delay time Tab by subtracting the value of offset from the reception time of the pilot signal.

The pilot signal Pa to be transmitted in the cooperative data transmission period may be the same as the SYNC pilot transmitted in the propagation delay time measurement period. The pilot signal Pa may be a unique signal having a format different from the SYNC pilot. Further, the value of offset for transmitting the pilot signal Pa may differ for each base station. In this case, the main base station serving as a source of the pilot signal Pa notifies the subordinate base station of its offset value, for example, by a beacon signal transmitted periodically. Instead of using the periodical beacon signal to notify the offset value, each base station may inquire the offset value of another base station in the cooperative relation.

Figure 7:
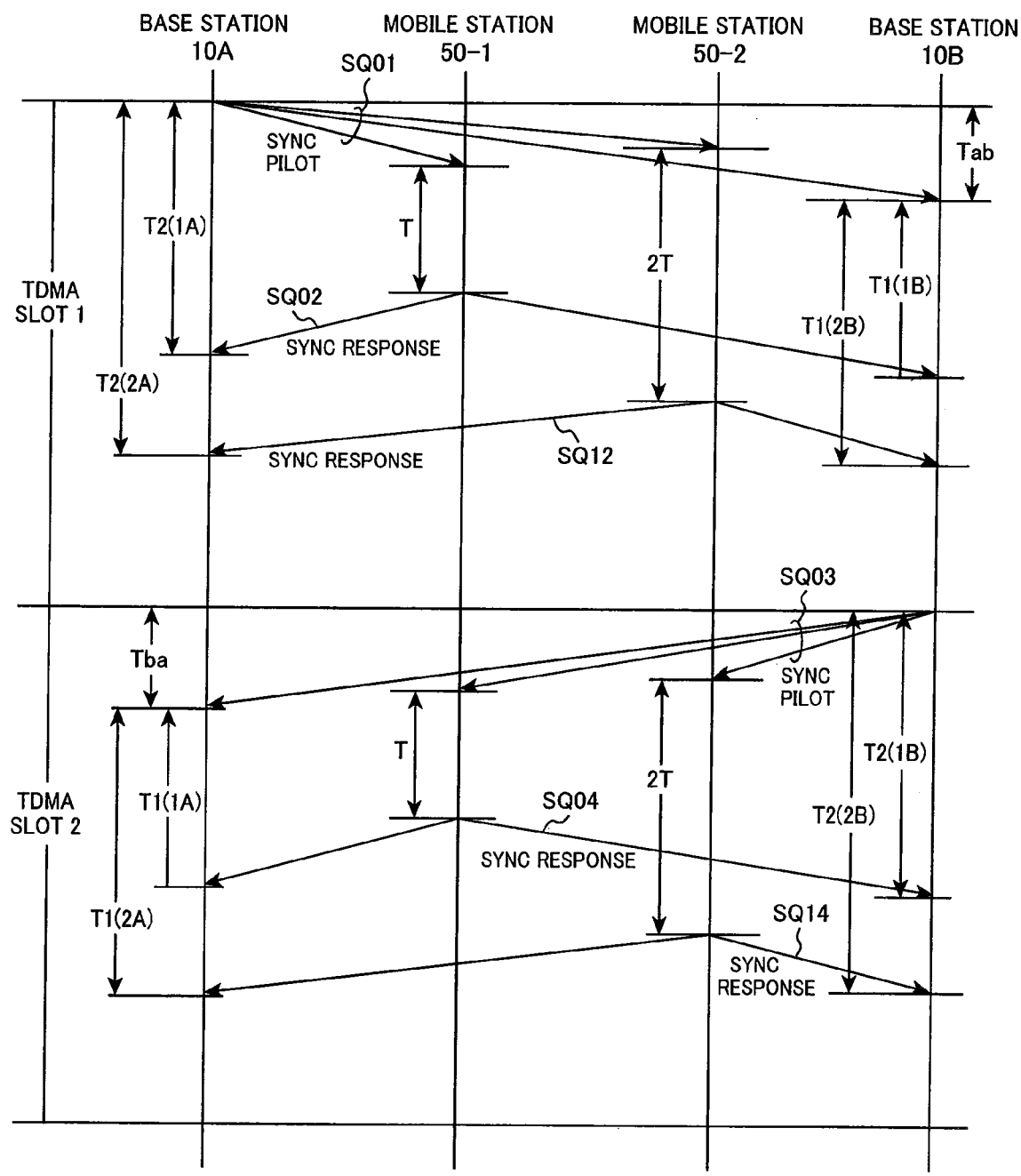
FIG. 7 is a diagram illustrating a communication sequence performed in the propagation delay time measurement period according to the second embodiment of the invention.

FIG. 7 is a diagram illustrating a communication sequence performed in the propagation delay time measurement period according to the second embodiment of the invention.

In this embodiment, transmission signals from the base stations 10A and 10B are synchronized at two mobile stations 50-1 and 50-2. Hereinafter, the time differences T1 and T2 necessary for the base station 10B to synchronize signals at the i-th mobile stations 50-i are referred to as T1(iB) and T2(iB).

The subordinate base station 10B can obtain the time differences T1(1B) and T2(1B) for synchronizing transmission signals from the base stations 10A and 10B at the mobile terminal 50-1, by performing Steps S11 to S16 having been explained with FIG. 5 in SQ01 to SQ04. The time differences T1(2B) and T2(2B) for synchronizing transmission signals from the base stations 10A and 10B at the mobile station 50-2 are obtained similarly by the method performed for the time differences T1(1B) and T2(1B).

That is, the mobile station 50-2 may transmit a SYNC response after a predetermined time has elapsed (SQ12) in response to the SYNC pilot signal transmitted from the main base station 10A and transmit a SYNC response after a predetermined time has elapsed (SQ14) in response to the SYNC pilot signal transmitted from the subordinate base station 10B. In this case, in order to prevent the SYNC response transmitted by the mobile station 50-2 from colliding with the SYNC response transmitted by the mobile station 50-1, the mobile station 50-2 transmits the SYNC response after a waiting time different from the waiting time T of the mobile station 50-1.

In FIG. 7, the waiting time of the mobile station 50-1 is set to T, and the waiting time of the mobile station 50-2 is set to 2T. The waiting time of each mobile station may be allocated explicitly from the base station controller when the mobile station is connected to the base stations with an association message. Each of the mobile stations may use a unique waiting time associated with its station ID. In the case where a mini-slot time required to prevent collision of response packets transmitted from a plurality of mobile stations is T and the transmission waiting time of a response packet at the mobile station is kT, the value of k may be determined depending on a uniform random number such that the maximum value of kT does not exceed the TDMA slot. In this case, each mobile station has to keep the value of k constant during the propagation delay time measurement period.

Since the main base station 10A also can obtain, similarly to the subordinate base station 10B, delay time information T1(1A) and T1(2A) for the mobile station 50-1 and delay time information T1(2A) and T2(2A) for the mobile station 50-2 in the propagation delay time measurement period, it is possible to switch the main base station and the subordinate base station in the cooperative data transmission period in the case of transmitting data to a plurality of mobile stations.

In this embodiment, when a SYNC response is received, the base station 10B (10A) extracts the mobile station ID included in the received SYNC response, and stores the delay time information T1(i) and T2(i) in association with the ID of the mobile station 50-i.

Figure 8:
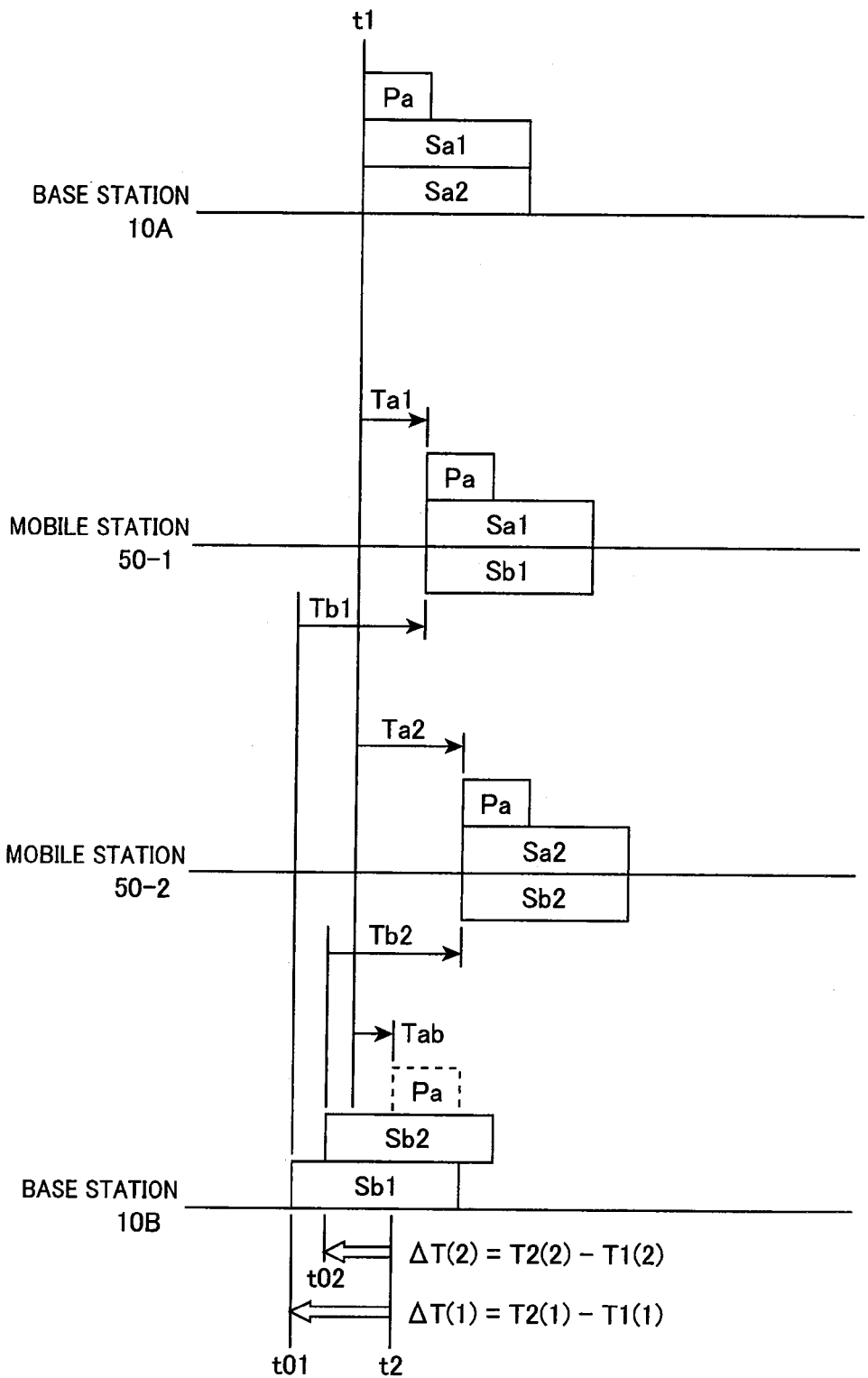
FIG. 8 is a diagram illustrating transmission timing control according to the invention when two base stations transmit data to a plurality of mobile stations.

FIG. 8 is a diagram illustrating data transmission to the mobile stations 50-1 and 50-2 in the cooperative data transmission period according to the second embodiment.

The main base station 10A transmits a data signal Sa1 for the mobile station 50-1 and a data signal Sa2 for the mobile station 50-2 at the slot reference timing t1 of the TDMA slot 3. The data signal Sa1 is received by the mobile station 50-1 after a propagation delay time Ta1, and the data signal Sa2 is received by the mobile station 50-2 after a propagation delay time Ta2.

In the same way as the first embodiment described by referring to FIG. 4, by using the reception time t2 of the pilot signal Pa transmitted from the main base station 10A as a reference timing, the subordinate base station 10B transmits a data signal Sb1 for the mobile station 50-1 at a timing t01 deviated from the reference timing by $\Delta T(1)(=T2(1B)-T1(1B))$, and transmits a data signal Sb2 for the mobile station 50-2 at a timing t02 deviated from the reference timing by $\Delta T(2)(=T2(2B)-T1(2B))$.

The data signal Sb1 is received by the mobile station 50-1 after a propagation delay time Tb1. It is apparent that the data signal Sb1 synchronizes with the data signal Sa1 at the mobile station 50-1 according to the principle explained by referring to FIG. 5. Similarly, the data signal Sb2 is received by the mobile station 50-2 after a propagation delay time Tb2 and synchronizes with the data signal Sa2 at the mobile station 50-2. Since the reception timings of the data signals individually transmitted from the base stations 10A and 10B are close to each other within the time width of the guard interval, the mobile station 50-1 (50-2) can decode desired signals Sa1 and Sb1 (Sa2 and Sb2) after eliminating interference components by the successive interference cancellation.

Figure 9:
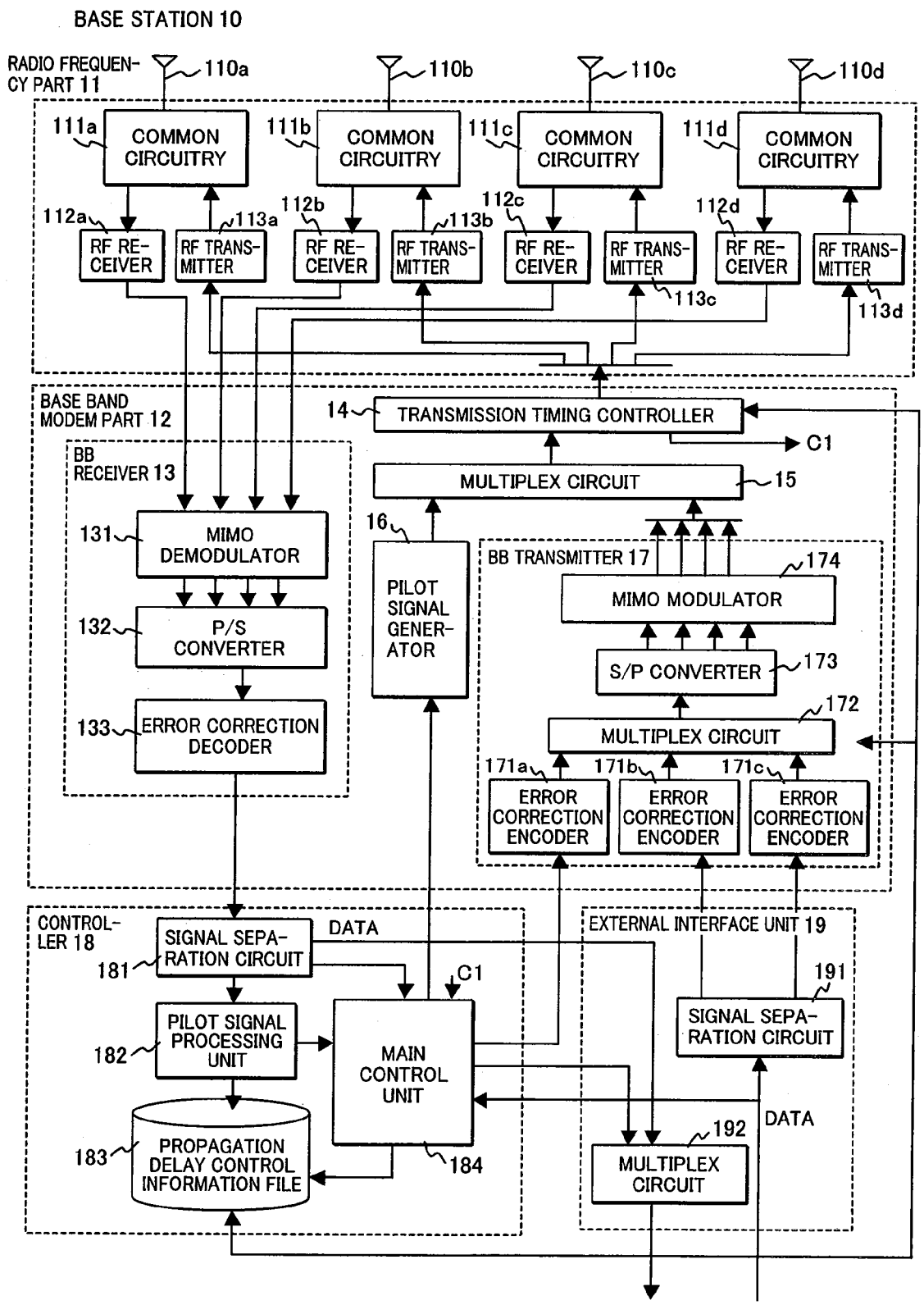
FIG. 9 is a diagram illustrating an embodiment of a base station 10.

FIG. 9 is a diagram illustrating an embodiment of the base station 10 (10A, 10B, ... ) having a synchronization control function according to the invention.

The base station 10 comprises a radio frequency part 11 provided with a plurality of antennas 110 (110a to 110d) for transmitting and receiving RF signals, a base band modem part 12 connected to the radio frequency part 11, and a controller 18 and an external interface unit 19 connected to the base band modem part 12.

The radio frequency part 11 comprises a plurality of common circuitries 111 (111a to 111d) each of which is connected to one of the antennas 110 (110a to 110d) and has a function of switching transmission and reception, and plural pairs of RF receiver 112 (112a to 112d) and RF transmitter 113 (113a to 113d), each pair being connected to one of the common circuitries (111a to 111d). The RF receiver 112i (i=a to d) perform filter processing on a reception signal from the antenna 110i, converts the filtered signal into an analog signal in a base band, and converts the analog signal into a digital signal (A/D conversion) to output the digital signal to the base band modem part 12. The RF transmitter 113i (i=a to d) converts a digital signal output from the base band modem part 12 into an analog signal (D/A conversion), performs frequency band conversion and power amplification on the analog signal, and outputs the amplified signal to the common circuitry 111i.

The base band modem part 12 comprises a base band receiver 13 to which reception signals are input in parallel from the plurality of RF receivers 112a to 112d of the radio frequency part 11, a transmission timing controller 14 connected to the plurality of RF transmitters 113a to 113d of the radio frequency part 11, a multiplex circuit 15 connected to the transmission timing controller 14, and a pilot generator 16 and a base band transmitter 17 connected to the multiplex circuit 15.

The base band receiver 13 includes a MIMO demodulator 131, a parallel/serial (P/S) converter 132, and an error correction decoder 133. The base band transmitter 17 includes a plurality of error correction decoders 171 (171a to 171c), a multiplex circuit 172 for multiplexing the outputs of the error correction decoders 171a to 171c, a serial/parallel (S/P) converter 173 for converting a serial signal output from the multiplex circuit 172 into a parallel signal, and a MIMO modulator 174 connected to the S/P converter 173.

The reception signals output from the RF receivers 112a to 112d of the radio frequency part are input in parallel to the base band receiver 13 of the base band modem part 12, and the signals from a plurality of mobile stations distributed to the plurality of antennas are demodulated by the MIMO demodulator 131. The demodulated signals corresponding to the plurality of antennas are converted into decodable data by the P/S converter 132. The error correction decoder 133 performs error correction decode processing on the decodable data, and outputs them to the controller 18.

In the controller 18, a signal separation circuit 181 separates the signals output from the base band receiver 13 into a control signal, user data, a SYNC pilot, and a SYNC response signal. The control signal is input to a main control unit 184 to perform protocol processing corresponding to the control signal. The user data is input to an external interface unit 19 in order to multiplex the user data with a control signal output from the main control unit 184 by a multiplex circuit 192 and transmit to a base station controller 20. The SYNC pilot and the SYNC response signal are input to a pilot signal processing unit 182.

The controller 18 is provided with a propagation delay control information file 183 for storing the reception times of the SYNC pilot and the SYNC response signal. The propagation delay control information file further stores time information necessary for synchronization control, time difference information ($\Delta T$), and control mode information indicating whether the base station is operating in a cooperative control mode. Upon receiving control mode information through a control signal from the base station controller 20, the main control unit 184 stores the control mode information in the propagation delay control information file 183. By referring to the control mode information, the main control unit 184 can determined whether the base station 10 should serve as the main base station 10A or the subordinate base station 10B in the cooperative control.

The data received from the base station controller 20 is separated into a plurality of data streams for each mobile station by a signal separation circuit 191 in the external interface unit 19. The data streams separated for each mobile station are input to the error correction encoders 171b and 171c in the base band transmitter 17 and converted into encoded data including a redundant code for error correction by each of the error correction encoders. Although only two data streams are shown in FIG. 9, the number of error correction encoders may be increased if the number of data stream is more than three.

A control signal addressed to the mobile station, which is generated by the main control unit 184, is converted into encoded data including a redundant code for error correction by the error correction encoder 171a. The outputs of the error correction encoders 171a to 171c are input to the S/P converter 173 after multiplexing by the multiplex circuit 172. The S/P converter 173 performs S/P conversion to convert the output signal from the multiplex circuit 172 into a plurality of signal strings such that transmission signals can be distributed to the plurality of antennas 110a to 110d. The parallel signals output from the S/P converter 173 are input to the MIMO modulator 174 and modulated such that each mobile station can perform MIMO demodulation. Conventional modulating method, such as linear processing and Tomlinson-Harashima precoding, is applicable to the MIMO modulator 174.

The pilot generator 16 generates a SYNC pilot signal at the timing instructed by the main control unit 184. The SYNC pilot signal generated by the pilot generator 16 is multiplexed with the data signal output from the MOMO modulator 174 of the base band transmitter 17 by the multiplex circuit 15, and output to the transmission timing controller 14.

The transmission timing controller 14 has a function of generating TDMA slots (TDMA frame). By referring to the control mode information stored in the propagation delay control information file 183, the transmission timing controller 14 notifies the main control unit 184 in the controller 18 of a slot number and the time t1 (signal C1) at the start timing (slot reference timing) of the TDMA slot when the base station is operating in the base station cooperative mode. In order to calculate the propagation delay time Tab between the base stations, the main control unit 184 stores the start time t1 of the TDMA slot received from the transmission timing controller 14 in the propagation delay control information file 183.

Upon receiving the SYNC pilot from the signal separation circuit 181, the pilot signal processing unit 182 of the controller 18 stores the reception time of the SYNC pilot in association with a source base station ID of the SYNC pilot into the propagation delay control information file 183. When a SYNC response signal is received, the pilot signal processing unit 182 stores the reception time and a source mobile station ID of the SYNC response signal in association with the source base station ID of the SYNC pilot in the propagation delay control information file 183, and notifies the main control unit 184 of the reception of SYNC response.

The main control unit 184 having been notified of the reception of SYNC response signal calculates a time difference between the reception time of the SYNC pilot and the reception time of the SYNC response signal with reference to the propagation delay control information file 183, and determines the control mode of the base station.

If the control mode is a main base station mode, the main control unit 184 stores the time difference between the reception time of the SYNC pilot and the reception time of the SYNC response signal as T1 or T2 in the propagation delay control information file 183. The main control unit 184 further calculates the value of Tba from the start time of the TDMA slot 2 and the reception time of the SYNC pilot received in the TDMA slot 2, and stores the value in the propagation delay control information file 183. When the value of T1 is specified, the main control unit 184 calculates the time difference $\Delta T(=T2-T1)$, and stores the value in the propagation delay control information file 183.

If the control mode is a subordinate base station mode, the main control unit 184 stores the time difference between the reception time of the SYNC pilot and the reception time of the SYNC response signal as T1 or T2 in the propagation delay control information file 183. The main control unit 184 further calculates the value of time difference Tab between the start time of the TDMA slot 1 and the reception time of the SYNC pilot received in the TDMA slot 1, and stores the value in the propagation delay control information file 183. When the value of T2 is specified, the main control unit 184 calculates the time difference $\Delta T(=T2-T1)$, and stores the value in the propagation delay control information file 183.

The transmission timing controller 14 refers to the control mode information stored in the propagation delay control information file 183. When it is determined that the base station should serve as the main base station for cooperative control, the transmission timing controller 14 transmits output data from the multiplex circuit 15 to the radio frequency part 11 at the transmission timing t1 of the base station 10A shown in FIG. 5 in each of TDMA time slots within the cooperative data transmission period. When it is determined that the base station should serve as the subordinate base station, the transmission timing controller 14 transmits output data from the multiplex circuit 15 to the radio frequency part 11 at the adjusted transmission timing to.

As explained with reference to FIG. 7, in the case where a plurality of mobile stations are objectives of synchronization control, for example, the multiplex circuit 172 of the base band transmitter 17 may adjust the transmission time of a data signal for each of mobile stations in accordance with the time difference between $\Delta T(1)$ and $\Delta T(2)$ shown in FIG. 8.

For example, when the adjustment time $\Delta T(1)[=T2(1)-T1(1)]$ of the data signal Sb1 for the mobile station 50-1 is longer than the adjustment time $\Delta T(2)[=T2(2)-T1(2)]$ of the data signal Sb2 for the mobile station 50-2 as shown in FIG. 8, dummy data is inserted before the data signal Sb2 during a period corresponding to $\Delta t = \Delta T1 - \Delta T2$.

Specifically, in the case where the data signal Sb1 is supplied to the error correction encoder 171b and the data signal Sb2 is supplied to the error correction encoder 171c, for example, the multiplex circuit 172 is controlled for the initial period $\Delta t$ of the data signal Sb1 so as to multiplex a signal string of 0, instead of the output of the error correction encoder 171c, with the data signal Sb1. After the period $\Delta t$ has elapsed, the multiplex circuit 172 is allowed to multiplex the data signal Sb2 output from the error correction encoder 171c with the data signal Sb1. In this case, the transmission timing controller 14 may transfer the output signal from the multiplex circuit 15 to the radio frequency part 11 at the timing to adjusted in accordance with the value of $\Delta T(1)$.

Instead of controlling the outputs of the error correction encoders 171b and 171c, a buffer memory may be provided at a front stage of each of the error correction encoders 171b and 171c so that data supply from the buffer memory to the error correction encoder 171b or 171c can be controlled in accordance with $\Delta t = \Delta T(1) - \Delta T(2)$.

As in the former case, if the multiplex circuit 172 of the base band transmitter 17 has to adjust the phase between data streams, the multiplex circuit 172 may be controlled by the transmission timing controller 14. As in the latter case, if the phase between the data signals has to be adjusted at a front stage of the error correction encoder 171b or 171c, reading out of data from the buffer memory may be controlled by the main control unit 184.

Figure 10:
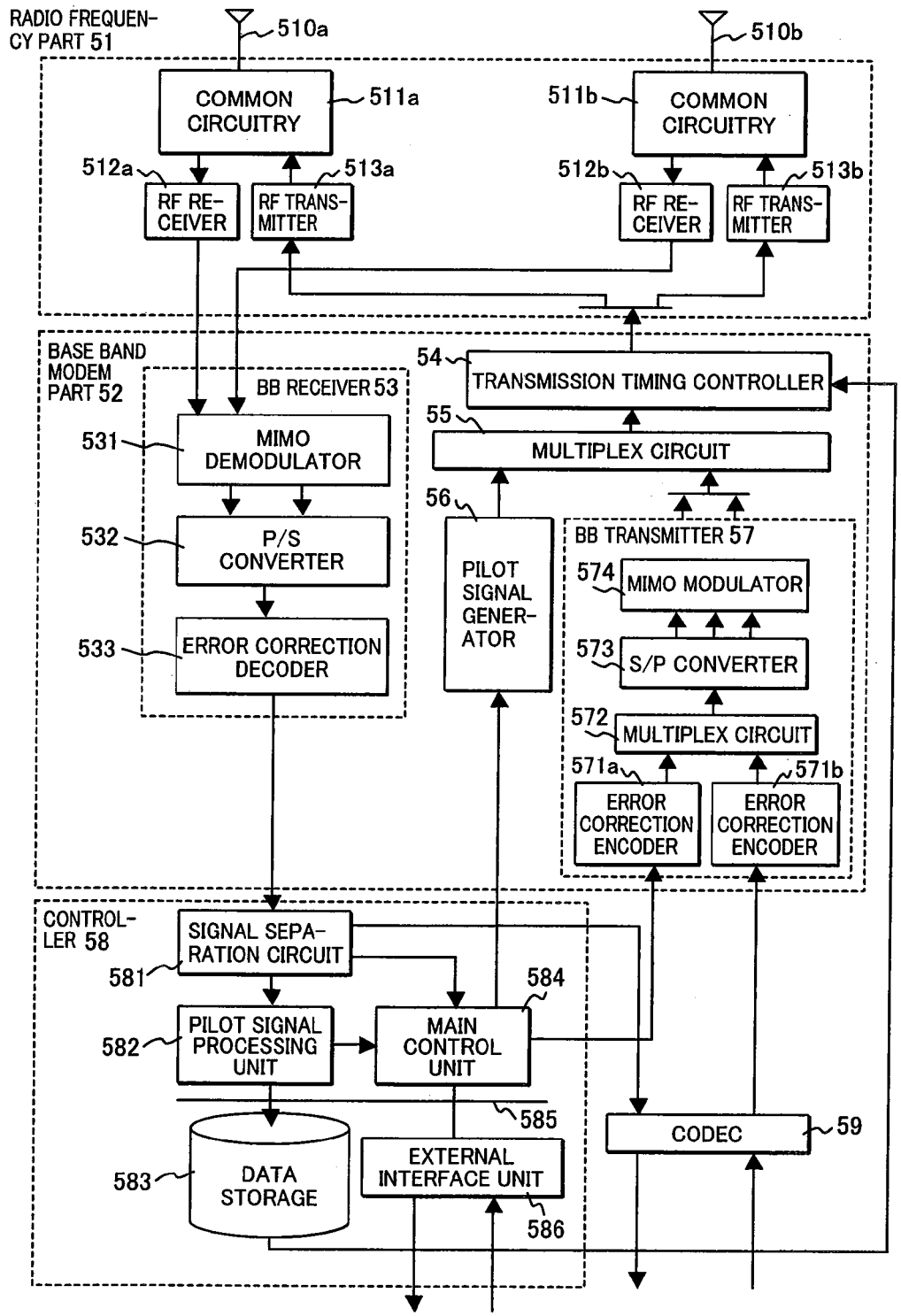
FIG. 10 is a diagram illustrating an embodiment of a mobile station 50.

FIG. 10 is a diagram illustrating an embodiment of the mobile station 50.

The mobile station 50 comprises a radio frequency part 51, a base band modem part 52 connected to the radio frequency part 51, and a controller 58 and a coder/decoder (CODEC) 59 connected to the base band modem part 52. The number of antennas of the radio frequency part 51 may be smaller than that of the base station. In this embodiment, the radio frequency part 51 includes two antennas 510a and 510b. The antenna 510a (510b) is connected to an RF receiver 512a (512b) and an RF transmitter 513a (513b) through a common circuitry 511a (511b) of the RF transmitter and the RF receiver.

Similarly to the base station, the base band modem part 52 comprises a base band receiver 53 to which reception signals from the RF receivers 512a and 512b of the radio frequency part 51 are input in parallel, a transmission timing controller 54 connected to the RF transmitters 513a and 513b of the radio frequency part 51, a multiplex circuit 55 connected to the transmission timing controller 54, and a pilot generator 56 and a base band transmitter 57 connected to the multiplex circuit 55.

The base band receiver 53 includes a MIMO demodulator 531, a P/S converter 532, and an error correction decoder 533. The base band transmitter 57 includes error correction decoders 571a and 571b, a multiplex circuit 572 for multiplexing the outputs of the error correction decoders, an S/P converter 573 connected to the multiplex circuit 572, and a MIMO modulator 574 connected to the S/P converter 573.

The coder/decoder (CODEC) 59 is connected to a voice I/O unit (not shown) and performs voice encoding/decoding for a mobile telephone. A voice signal output from the voice I/O unit is input to the error correction decoder 571b after decoded by the CODEC 59.

The controller 58 includes a signal separation circuit 581 connected to the base band receiver 53, a pilot signal processing unit 582 and a main control unit (processor) 584 connected to the signal separation circuit 581, a data storage 583 connected to the main control unit 584 through an internal bus 585, and an external interface unit 586 connected to the internal bus 585. An input/output device (not shown), such as a display device and input keys, is connected to the external interface unit 586. In the data storage 583, various application programs and data to be used by the main control unit 584 are stored.

The signal separation circuit 581 discriminates the kind of signal output from the base band receiver 53, and outputs the voice signal to the CODEC 59, the SYNC pilot to the pilot signal processing unit 582, and user data and a control signal other than the voice signal to the main control unit 584. Upon receiving the control signal, the main control unit 584 performs a protocol processing corresponding to the control signal. Upon receiving the user data, the main control unit 584 executes an application program corresponding to the received data. For example, when image (moving picture) data is input from the base band modem part 52, the main control unit 584 decodes the received data by an image decoding routine, such as MPEG, and outputs the decoded data to a display screen through the external interface unit 586. The main control unit 584 may decode the image data after temporarily storing the received data in the data storage. Image data decoding may be carried out by a dedicated hardware component.

In this embodiment, the transmission timing of data from the mobile station to the base station is adjusted by the transmission timing controller 54 depending on a propagation delay. In the same way as the base station 10, propagation delay control information necessary for adjusting the transmission timing is stored in the data storage 583 by the pilot signal processing unit 582 and the main control unit 584. If the adjustment of the data transmission timing depending on the propagation delay is not needed, the propagation delay control information is not stored in the data storage database 583.

As explained by referring to FIG. 6, when the SYNC pilot is received from the base station, the mobile station 50 has to transmit a SYNC response to the base station after a predetermined time. In this embodiment, upon detecting the SYNC pilot, the pilot signal processing unit 582 stores the source ID and the reception time of the SYNC pilot in a transmission control information area defined in the data storage 583, and outputs a SYNC response transmission request to the main control unit 584. Upon receiving the SYNC response transmission request from the pilot signal processing unit 582, the main control unit 584 refers to the source ID and the reception time of the SYNC pilot stored in the transmission control information area of the data storage 583, and instructs the pilot generator 56 to generate a SYNC response after a predetermined waiting time T has elapsed. The waiting time T is stored as a value different for each mobile station in the transmission control information area. If the reception time of the SYNC pilot is stored by the main control unit 584, the pilot signal processing unit 582 may be omitted, and the SYNC pilot is directly transferred from the signal separation circuit 581 to the main control unit 584.

According to the invention, the transmission timing of the data signals to be transmitted to the same mobile station from a plurality of base stations, each having a plurality of antennas, is controlled by cooperation among the base stations. Therefore, the mobile station 50 can receive the data signals, which are transmitted in parallel from different base stations, as parallel data signals whose reception timings are close to each other within the time width of the guard interval as if they are transmitted in parallel from the same base station. As a result, the invention can increase the equivalent number of transmission antennas on the base station side, and improve the overall throughput of a system and the throughput per mobile station.

Figure 11:
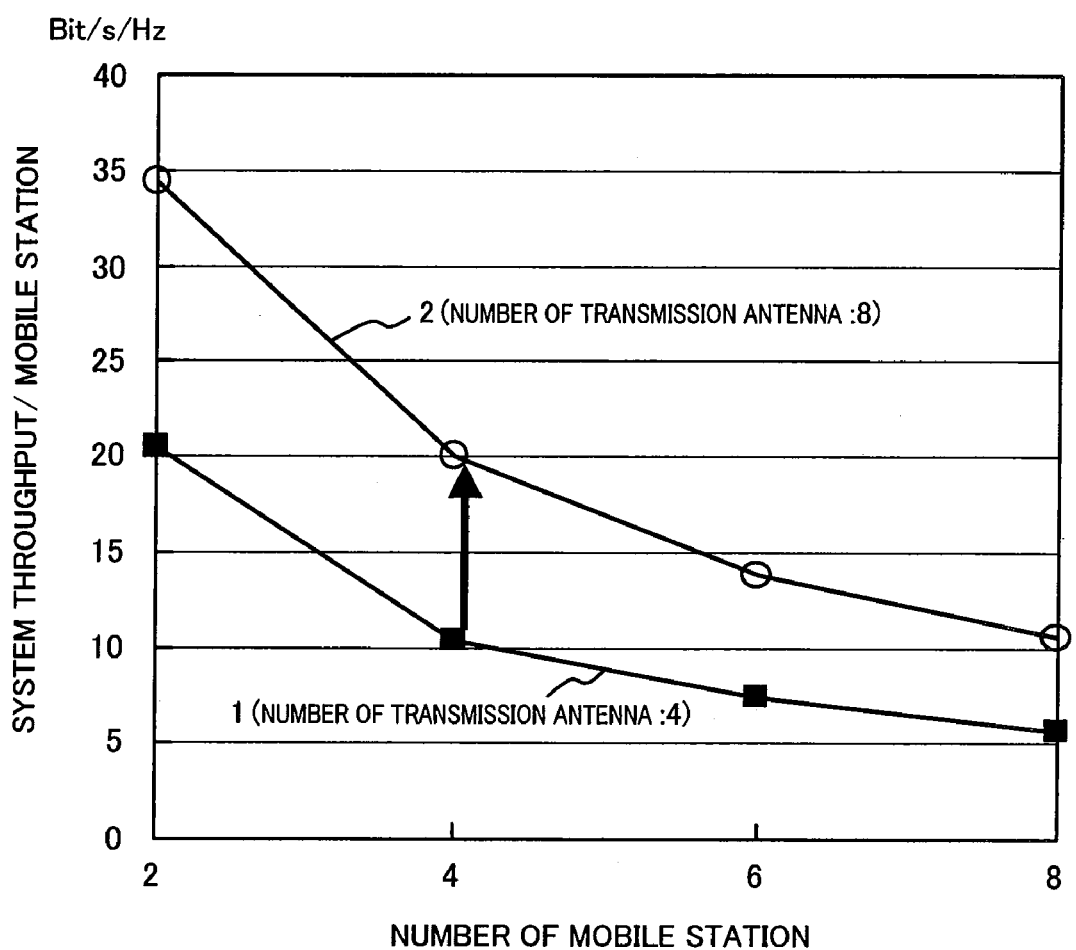
FIG. 11 is a diagram illustrating the effects of the invention.

FIG. 11 is a graph illustrating an increase in throughput by cooperative control among the base stations of the invention.

It is assumed here that each of the base stations 10A and 10B has four antennas and each of the mobile stations 50 (50-1, 50-2, 50-3, . . . ) also has four antennas. In FIG. 11, the horizontal axis indicates the number of mobile stations, and the vertical axis indicates the average of throughput per mobile station obtained by dividing the overall throughput of a wireless communication system comprising the base stations 10A and 10B by the number of mobile stations.

As indicated by graph 1, in the case where the base station 10A transmits data independently, the number of transmission antennas is four and the number of mobile stations to be communication peers is four, the average of throughput per mobile station is 10 bit/s/Hz. As the number of mobile stations increases, the average of throughput per mobile station reduces.

In contrast, as indicated by graph 2, in the case where a base station controller 20a makes the base stations 10A and 10B cooperate with each other so as to perform cooperative control on data transmission, the total number of transmission antennas on the base station side is increased to eight In this case, the average of throughput per mobile station is increased to 20 bit/s/Hz when the number of mobile stations to be communication peers is four. Thus, it is understood that the cooperative control among the base stations according to the invention can increase the number of effective antennas on the base station side and improve the overall throughput of a communication system.

In the above-described embodiment, both the main base station 10A and the subordinate base station 10B can obtain time difference information necessary for performing synchronization control, by transmitting a SYNC pilot from the main base station 10A in the first TDMA slot within the propagation delay time measurement period, and by transmitting a SYNC pilot from the subordinate base station 10B in the second TDMA slot within the propagation delay time measurement period. However, the base stations 10A and 10B can measure T1 and T2 by using, instead of the SYNC pilot, another kind of signal frame which is periodically transmitted at the slot reference timing of each TDMA slot as a synchronization control signal for requesting the mobile station 50 to reply a response signal.

What is claimed is:

1. A data transmission timing control method in a wireless communication system in which a first transmitting station and a second transmitting station, each having a first plurality of antennas, cooperate with each other to transmit data signals in parallel to the same receiving station having a second plurality of antennas through a series of TDMA slots, the method comprising the steps of:

detecting by the second transmitting station, a signal propagation delay time between the first and second transmitting stations and signal propagation delay times between the receiving station and the first and second transmitting stations within a propagation delay time measurement period before a data transmission period;

calculating by the second transmitting station, the adjustment amount of data transmission timing for the receiving station based on the signal propagation delay times detected within the propagation delay time measurement period;

transmitting data from the first transmitting station to the receiving station at a slot reference timing in each of TDMA slots within the data transmission period; and transmitting data from the second transmitting station to the receiving station at a transmission timing determined by the slot reference timing, the signal propagation delay time between the first and second stations and the adjustment amount in each of TDMA slots within the data transmission period, thereby to synchronize the reception timings of data transmitted in parallel from the first and second transmitting stations each having the first plurality of antennas, within an allowable range of a time difference at the receiving station having the second plurality of antennas.

2. The data transmission timing control method according to claim 1, wherein the propagation delay time measurement period includes a first TDMA slot and a second TDMA slot, wherein the first transmitting station transmits a first synchronization control signal to the receiving station at a slot reference timing of the first TDMA slot, wherein the receiving station having received the first synchronization control signal transmits a first response signal to the first transmitting station after a predetermined time T has elapsed, wherein the second transmitting station detects the reception time of the first synchronization control signal transmitted from the first transmitting station and the reception time of the first response signal transmitted from the receiving station within the first TDMA slot, and stores first time information indicating a time difference between the slot reference timing of the first TDMA slot and the reception time of the first synchronization control signal and second time information indicating a time difference between the reception time of the first synchronization control signal and the reception time of the first response signal, wherein the second transmitting station transmits a second synchronization control signal to the receiving station at a slot reference timing of the second TDMA slot, wherein the receiving station having received the second synchronization control signal transmits a second response signal to the second transmitting station after the predetermined time T has elapsed, and wherein the second transmitting station measures a time difference between the transmission time of the second synchronization control signal and the reception time of the second response signal transmitted from the receiving station within the second TDMA slot, and calculates the adjustment amount of data transmission timing based on the first and second time information and third time information indicating the measured time difference.

3. The data transmission timing control method according to claim 2, wherein the adjustment amount of the data transmission timing is represented by $Tab-(T2-T1)$ in the case where the time difference indicated by the first time information is Tab, the time difference indicated by the second time information is T1, and the time difference indicated by the third time information is T2.

4. The data transmission timing control method according to claim 3, wherein the first transmitting station transmits a pilot signal together with the data at the slot reference timing of each TDMA slot within the data transmission period, and wherein the second transmitting station detects a time difference between the slot reference timing and the reception time of the pilot signal, and calculates the adjustment amount of data transmission timing by using the time difference as the latest value of Tab in each TDMA slot within the data transmission period, thereby to apply the adjustment amount to the next TDMA slot.

5. A data transmission timing control method in a wireless communication system in which a first transmitting station and a second transmitting station, each having a first plurality of antennas, cooperate with each other to transmit data signals in parallel to a plurality of receiving stations, each having a second plurality of antennas, through a series of TDMA slots, the method comprising the steps of:

detecting by the second transmitting station, a signal propagation delay time between the first and second transmitting stations and signal propagation delay times between each of the receiving stations and the first and second transmitting stations within a propagation delay time measurement period before a data transmission period;

calculating by the second transmitting station, the adjustment amount of data transmission timing for each of the receiving stations based on the signal propagation delay times detected within the propagation delay time measurement period;

transmitting data from the first transmitting station to each of the receiving stations at a slot reference timing in each TDMA slot within the data transmission period; and transmitting data from the second transmitting station to each of the receiving stations at different transmission timings determined for each receiving station based on the slot reference timing, the signal propagation delay time between the first and second transmitting stations and the adjustment amount of data transmission timing, in each TDMA slot within the data transmission period, thereby to synchronize the reception timings of data transmitted in parallel from the first and second transmitting stations, that each have the first plurality of antennas, within an allowable range of a time difference at the receiving station, which has the second plurality of antennas.

6. The data transmission timing control method according to claim 5, wherein the propagation delay time measurement period includes a first TDMA slot and a second TDMA slot, wherein the first transmitting station transmits a first synchronization control signal at a slot reference timing of the first TDMA slot, wherein each of the receiving stations having received the first synchronization control signal transmits a first response signal to the first transmitting station after an individual waiting time different for each receiving station has elapsed, wherein the second transmitting station detects the reception time of the first synchronization control signal transmitted from the first transmitting station and the reception time of each of the first response signals transmitted from the receiving stations within the first TDMA slot, and stores first time information indicating a time difference between the slot reference timing of the first TDMA slot and the reception time of the first synchronization control signal and second time information indicating a time difference between the reception time of the first synchronization control signal and the reception time of the first response signal for each receiving station, wherein the second transmitting station transmits a second synchronization control signal at a slot reference timing of the second TDMA slot, wherein each of the receiving stations having received the second synchronization control signal transmits a second response signal to the second transmitting station after the individual waiting time has elapsed, and wherein the second transmitting station measures a time difference between the transmission time of the second synchronization control signal and the reception time of each of the second response signals transmitted from the receiving stations within the second TDMA slot, and calculates for each of the receiving stations the adjustment amount of data transmission timing based on the first time information, the second time information and third time information indicating a time difference between the transmission time of the second synchronization control signal and the reception time of the second response signal.

7. The data transmission timing control method according to claim 6,
wherein each of the receiving stations uses a value designated by one of the first transmitting station and the second transmitting station as the individual waiting time.

8. The data transmission timing control method according to claim 6,
wherein each of the receiving stations uses a value determined depending on a random number as the individual waiting time.

9. The data transmission timing control method according to claim 6,
wherein the adjustment amount of the data transmission timing is represented by Tab−(T2−T1) in the case where the time difference indicated by the first time information is Tab, the time difference indicated by the second time information is T1, and the time difference indicated by the third time information is T2.

10. The data transmission timing control method according to claim 9,
wherein the first transmitting station transmits a pilot signal together with the data at the slot reference timing of each TDMA slot within the data transmission period, and
wherein the second transmitting station detects a time difference between the slot reference timing and the reception time of the pilot signal, and calculates the adjustment amount of data transmission timing by using the time difference as the latest value of Tab in each TDMA slot within the data transmission period, thereby to apply the adjustment amount to the next TDMA slot.

11. The data transmission timing control method according to claim 6,
wherein each of the receiving stations uses a unique value associated with the receiving station as the individual waiting time.

12. A wireless communication system comprising a plurality of base stations, each having a first plurality of antennas and being connected to a base station controller, a first base station and a second base station designated by the base station controller cooperate with each other to transmit data in parallel to the same receiving station, having a second plurality of antennas, through a series of TDMA slots, the first base station comprising:
a transmission control unit to transmit a first synchronization control signal to the receiving station at a slot reference timing of a first TDMA slot within a propagation delay time measurement period before a data transmission period; and
a transmission timing controller for transmitting data to the receiving station at a slot reference timing of each TDMA slot within the data transmission period for the receiving station, and the second base station comprising:
a first detection unit to detect the reception time of the first synchronization control signal transmitted from the first base station and the reception time of a first response signal transmitted from the receiving station in the first TDMA slot within the propagation delay time measurement period, and store in a memory, first time information indicating a time difference between the slot reference timing of the first TDMA slot and the reception time of the first synchronization control signal and second time information indicating a time difference between the reception time of the first synchronization control signal and the reception time of the first response signal;
a transmission control unit to transmit a second synchronization control signal to the receiving station at the slot reference timing of a second TDMA slot within the propagation delay time measurement period;
a second detection unit to detect a time difference between the transmission time of the second synchronization control signal and the reception time of a second response signal transmitted from the receiving station in the second TDMA slot, and store third time information indicating the time difference in the memory;
a calculator to calculate the adjustment amount of data transmission timing for the receiving station based on the first, second, and third time information stored in the memory, and store the adjustment amount in the memory; and
a transmission timing controller for transmitting data to the receiving station at a transmission timing determined based on the slot reference timing, the signal propagation delay time between the first and second base stations and the adjustment amount stored in the memory, in each TDMA slot within the data transmission period for the receiving station, thereby to synchronize the reception timings of data transmitted in parallel from the first and second base stations, each having the first plurality of antennas, within an allowable range of a time difference at the receiving station having the second plurality of antennas.

* * * * *